United States Patent
Kortina et al.

(10) Patent No.: US 9,947,011 B2
(45) Date of Patent: Apr. 17, 2018

(54) ENVIRONMENT AND METHODS FOR ENABLING ELECTRONIC TRANSACTIONS

(71) Applicant: PAYPAL, INC., San Jose, CA (US)

(72) Inventors: Andrew Kortina, New York, NY (US); William Ready, Winnetka, IL (US); Dan Manges, Chicago, IL (US); John Sturino, Palo Alto, CA (US); Juan Benitez, II, Los Gatos, CA (US)

(73) Assignee: PAYPAL, INC., San Jose, CA (US)

( * ) Notice: Subject to any disclaimer, the term of this patent is extended or adjusted under 35 U.S.C. 154(b) by 499 days.

(21) Appl. No.: 13/755,262

(22) Filed: Jan. 31, 2013

(65) Prior Publication Data

US 2014/0143145 A1 May 22, 2014

Related U.S. Application Data

(60) Provisional application No. 61/728,766, filed on Nov. 20, 2012.

(51) Int. Cl.
*G06Q 20/40* (2012.01)
*G06Q 20/22* (2012.01)
(Continued)

(52) U.S. Cl.
CPC ......... *G06Q 20/401* (2013.01); *G06Q 20/227* (2013.01); *G06Q 20/322* (2013.01); *G06Q 20/385* (2013.01)

(58) Field of Classification Search
CPC ......... G06Q 20/32; G06Q 20/36; G06Q 20/40
(Continued)

(56) References Cited

U.S. PATENT DOCUMENTS 7,203,839 B2  4/2007  Richards, Jr. et al.
7,350,081 B1  3/2008  Best
(Continued)

FOREIGN PATENT DOCUMENTS

KR  2001-0110740  12/2001

OTHER PUBLICATIONS

Affirm, Turning Mobile Shopping Trends Into Mobile Buying Trends, 2013, 5 pages. https://www.affirm.com/help.
(Continued)

*Primary Examiner* — Jessica Lemieux
(74) *Attorney, Agent, or Firm* — Haynes and Boone, LLP

(57) ABSTRACT

A method includes receiving a request for registered payment options associated with a user computing device, where the request includes an identifier uniquely identifying one of the user computing device and the user. The method includes identifying one or more payment options associated with the device identifier, where each of the one or more payment options is associated with respective payment instrument information. The method includes providing one or more codes, where each code of the one or more codes identifies a respective payment option of the one or more payment options. The method includes receiving a first code of the one or more codes and transaction information. The method includes accessing, based upon the first code, payment instrument information associated with the payment option identified by the first code, and causing the processing of the payment instrument information in relation to a transaction identified by the transaction data.

22 Claims, 9 Drawing Sheets

(51) Int. Cl.
*G06Q 20/32* (2012.01)
*G06Q 20/38* (2012.01)

(58) Field of Classification Search
USPC .................................................. 705/44, 40
See application file for complete search history.

(56) References Cited

U.S. PATENT DOCUMENTS

| | | | |
|---|---|---|---|
| 8,423,457 | B1 | 4/2013 | Schattauer et al. |
| 8,549,279 | B1* | 10/2013 | Sahasranaman et al. .... 713/150 |
| 2002/0133467 | A1* | 9/2002 | Hobson et al. ................ 705/64 |
| 2004/0111360 | A1* | 6/2004 | Albanese ........................ 705/38 |
| 2006/0016880 | A1* | 1/2006 | Singer et al. ................. 235/380 |
| 2006/0020542 | A1* | 1/2006 | Litle et al. ...................... 705/40 |
| 2006/0081702 | A1* | 4/2006 | Nandakumar ................ 235/380 |
| 2006/0091223 | A1* | 5/2006 | Zellner et al. ................ 235/492 |
| 2008/0011825 | A1* | 1/2008 | Giordano et al. ............ 235/380 |
| 2009/0083542 | A1 | 3/2009 | Craft et al. |
| 2009/0182674 | A1* | 7/2009 | Patel et al. ..................... 705/72 |
| 2009/0233579 | A1 | 9/2009 | Castell et al. |
| 2012/0084204 | A1 | 4/2012 | Castell et al. |
| 2014/0095385 | A1* | 4/2014 | Ainslie et al. ................. 705/44 |

OTHER PUBLICATIONS

Alvarez, Edgar, Mastercard Announces MasterPass Digital Banking Service, Gives Australia and Canada First Dibs, Feb. 25, 2013, 7 pages.

Google, Death by a Thousand Cuts? Google Wallet's Plan to Take on PayPal Leverages Chrome, Android, Google+, Gmail and More, TechCrunch, 2013, 4 pages, http://techcrunch.com/2013/05/15/death-by-a-thousand-cuts-google-wallets-plan-to-take-on-paypal-leverages-chrome-android-google-gmail-more/.

Greenfield, Rebecca, There's Finally a Reason to Be Jealous of Clinkle's $25 Million Stanford Dropouts, The Atlantic Monthly Group, 2013, 2 pages, http://www.theatlanticwire.com/technology/2013/07/what-is-clinkle/66792/.

O'Brien, Terrence, Mastercard Introduces PayPass Wallet Services, Online and API at CTIA 2012, May 7, 2012, 2 pages.

PayPal, PayPal iOS SDK, Jul. 19, 2013, 4 pages. https://developer.paypal.com/webapps/developer/docs/integration/mobile/ios-integration-g . . . .

Visa, Global Payments Confirms Support for V.me by Visa, Visa Europe, Apr. 4, 2013, 1 page.

Visa, Nationwide to Offer V.me by VIsa to Customers in 2013, Visa Europe, Feb. 12, 2013, 1 page.

Visa, V.me by Visa Adds Dixons Retail to its Digital Wallet Service, Visa Europe, Jun. 24, 2013, 3 pages.

Visa, V.me by Visa, Jul. 19, 2013, 4 pages, https://uk.v.me/media/main.aspx.

Visa, Visa Europe Confirms Launch Date for V.me Digital Wallet, Visa Europe, Apr. 30, 2012, 1 page.

Visa, Visa Europe Confirms RBS as Launch Partner for V.me by Visa, Visa Europe, Nov. 28, 2012, 1 page.

International Search Report for PCT/US13/24082; 3 pages, dated Apr. 9, 2013.

Written Opinion for PCT/US13/24082; 3 pages, dated Apr. 9, 2013.

* cited by examiner

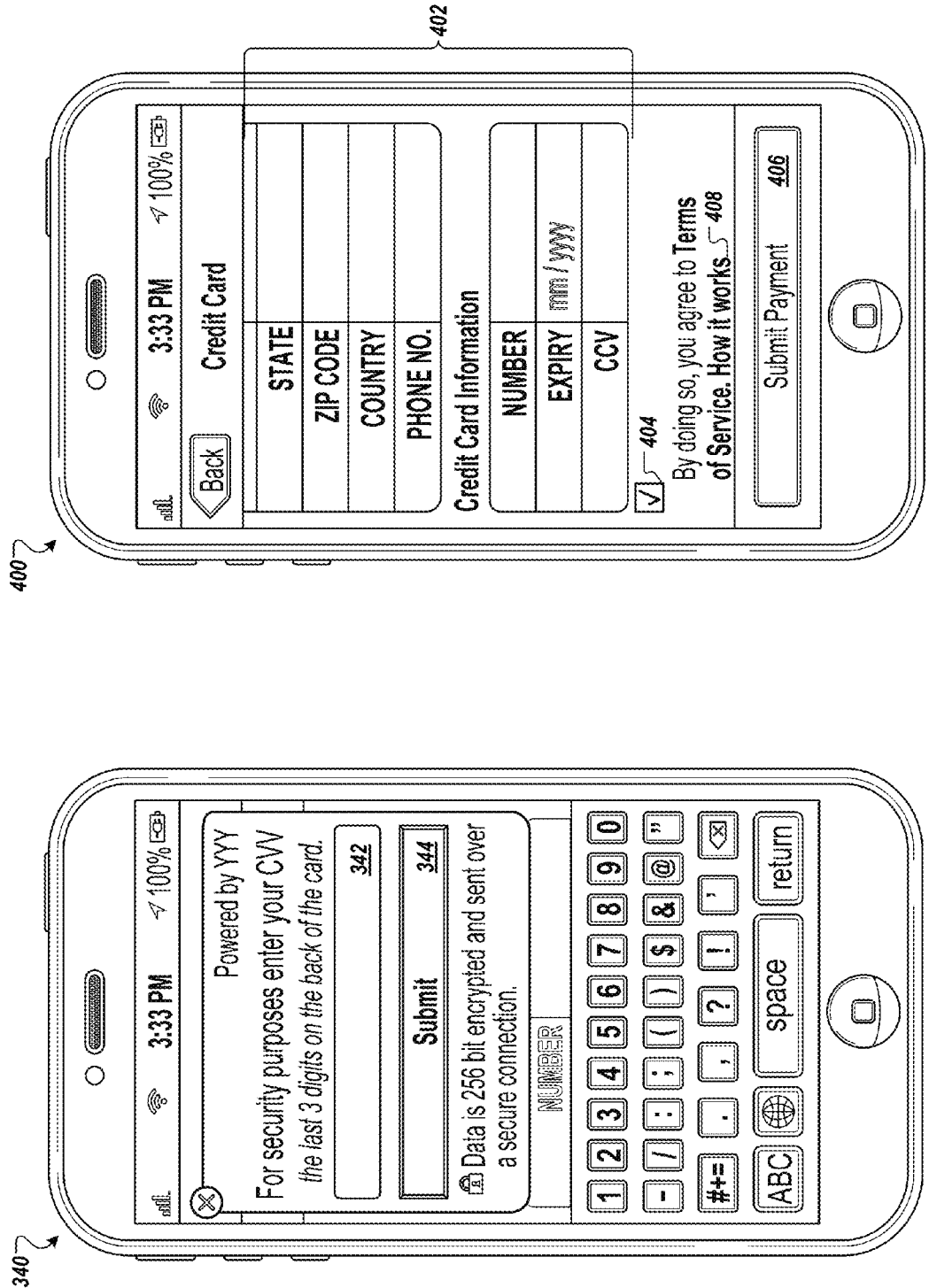

ENVIRONMENT AND METHODS FOR ENABLING ELECTRONIC TRANSACTIONS

RELATED APPLICATIONS

The present application claims priority to U.S. Provisional Application No. 61/728,766 entitled "Environment and Methods for Enabling Electronic Transactions," and filed on Nov. 20, 2012, the contents of which are hereby incorporated by reference in its entirety.

BACKGROUND

Information such as personal data and other sensitive information may be passed across a network such as the Internet, for example to provide credential information, payment information, or personal account management information. To protect sensitive information, the information can be transmitted over a secure transmission connection, such as Transport Layer Security (TLS) or Secure Socket Layer (SSL).

To secure information from unauthorized review, the information can be digitally encrypted. One example of digital encryption is public key cryptography. In the public key cryptography scheme, two separate but mathematically-connected keys (e.g., numeric values) are used to secure the information. The first, a public key, is used to encrypt the data using an encryption algorithm. The second, a private key, can be used by the receiver of the data to decrypt the encrypted information. The receiver supplies the sender with the public key such that the sender is capable of securely transmitting information to the receiver.

The receiver of sensitive information may be obligated to secure the privacy of the user from unauthorized access to the sensitive information. Information may be sensitive if the information is confidential (e.g., industry and/or professional standards indicate that only designated parties should have access to the information). Information may be sensitive if a party incurs regulatory obligations for handling the information due to exposure to the information. Information may be sensitive if a party incurs potential liability due to handling of and/or exposure to the information.

An example of sensitive information is payment instrument information, such as a credit card number. When merchants conduct transactions using a credit card number, a variety of information is requested from the card holder, such as the credit card number and credit verification value (CVV), name of the card holder as printed on the card, card expiration date, and the card holder address. The personal information entered by the user may be used by a transaction processing system (e.g., credit card processing system) to validate the credit card is being used by the credit card holder.

When conducting electronic transactions, payment instrument information may be stored for later use. For example, some online retailers provide the user with the opportunity to store information regarding one or more credit cards for later use. Upon providing user credentials with the retailer (e.g., username and password), the credit card holder may be presented with the opportunity to select a previously used credit card. When storing information on credit cards for later use, the retailer typically requires the user to provide secure login information (e.g., a user name and password combination). When conducting a later transaction, the user is prompted for the secure login information prior to being provided the opportunity to use the stored payment instrument information. This often results in the user needing to remember multiple user names and passwords, as secure login requirements may differ from retailer to retailer. Additionally, this may result in the user resorting to less secure login information to improve ease of remembrance.

Alternatively, a user, when conducting electronic transactions, may register with an electronic wallet (eWallet) vendor. Through a computer application provided by the eWallet vendor, for example, the user may receive authorization for conducting a transaction.

There exists a need for a solution that remains resident to the experience provided by the online retailer, yet bypasses the requirements for remembering retailer-specific usernames and passwords for accessing payment instrument information. There additionally exists a need for a solution that allows for the authorizing the transfer of stored credit card information from a first online retailer to a second online retailer, thus providing an enter once solution for accessing payment instrument information across multiple online retailers.

SUMMARY

In general overview, an intermediary party provides an online retailer with a software library for building a computing device application (e.g., mobile application) including a software library directed towards enabling electronic transactions via the intermediary party (e.g., payment gateway). The software library, for example, may include a number of function calls directed towards communicating transaction information with the intermediary party. The transaction information, in some implementations, is forwarded to the intermediary party from a mobile device executing the retailer application via a retailer server in communication with the retailer application (e.g., serving information regarding goods and services for sale to the retailer application).

Upon installation and execution of the retailer mobile application including the software library, a user is provided the opportunity to register one or more electronic payment instruments, such as credit cards with the intermediary party. Registration, in some implementations, occurs during an electronic transaction process. For example, upon submitting credit card information for remitting payment during the transaction process, the user may be prompted with the opportunity to store the credit card information with the intermediary party for later use. In some implementations, the retailer mobile application provides the user with a credit card entry form that is separate from the transaction process. For example, the user may be provided with the opportunity to add, remove, and/or update credit card information without conducting a transaction.

In order for the third party transaction support solution to achieve a strong level of adoption by both merchants and their customers, the process for registering payment instruments with the intermediary party, in some implementations, is designed to include as few extra steps beyond a typical merchant checkout experience as possible. For example, rather than presenting the customer with registration steps including creating a new username, password, and email address to register the customer with the intermediary party service, in some implementations, the intermediary party service automates (or semi-automates) the registration process by saving a portion of the information related to the payment instrument (e.g., previously entered by the customer via a merchant software application). For example, the automated registration process may be initiated through the customer agreeing to save the payment instrument information with the intermediary party (e.g., via selecting an accept control in a user interface generated by a software library provided by the intermediary party). In some implementations, to uniquely identify the customer, the intermediary party may derive identifying information from the customer computing device (e.g., a unique device identifier, telephone number, unique identifier associated with the intermediary party software library installed upon the customer computing device, etc.).

In some implementations, unique identifying information is stored to the customer computing device. After registration of a customer with the intermediary party service, in some implementations, the customer can be automatically identified based upon information derived from and/or stored to the customer computing device. The identification, in some implementations, is made regardless of whether the customer is accessing a same merchant service (e.g., same merchant software application) or a different merchant service (e.g., a software application supplied by a second merchant registered with the intermediary service). In this manner, the intermediary party service may automatically look up saved payment instrument information related to the identified customer. In some implementations, the intermediary party service prompts the customer for authentication information prior to providing information regarding stored payment instruments. For example, the customer may be prompted, via a user interface, to enter a security code. Upon receipt of the security code, the intermediary party service may validate the security code in relation to the saved payment instrument(s).

Furthermore, for ease of use, the third party transaction support solution, in some implementations, includes migration of registered payment instruments between member merchants. After registration of a payment instrument with the third party payment gateway, in some implementations, payment instrument information may change (e.g., updated expiration date, etc.). Upon addition or change of credit card information, in some implementations, the information is shared (e.g., upon user authorization) with the intermediary party.

In some implementations, if the user elects to use the intermediary party's service, the intermediary party can save the user's credit card information and present the user the option to easily share that credit card information with other retailers. For example, the user may install a second retailer application associated with a second online retailer. Upon conducting a transaction, if the second retailer application is registered with the intermediary party, the intermediary party may present, via the second retailer application, the credit card stored by the user in relation to the first retailer application. In some implementations, the intermediary party associates the credit card information with the second retailer application using an identifier derived from the mobile device. If the user wishes to use the stored credit card information to perform a transaction with the second retailer, the user can authorize the intermediary party to share the stored credit card information via the software library embedded within the second retailer application so that the user does not have to manually enter all of the credit card information directly into a credit card entry form supplied by the second retailer.

In some implementations, upon subsequent transactions, the retailer application, with support from the intermediary party, presents the previously stored credit card for use in the transaction. Upon selection by the user, in some implementations, the transaction proceeds with payment processing. For example, the retailer application may support one-touch transaction processing upon a mobile device without prompting the user for further entry of information, such as a password information. In other implementations, the user is first prompted to authenticate the card with authentication information. To authenticate that the credit card holder is conducting the transaction via the mobile device executing the retailer application, in some implementations, the software library of the retailer application requests authentication information that can be used to authenticate the credit card with the credit card processor. For example, the software library may request a CVV code or zip code to authenticate use of the credit card. The software library portion of the retailer application may send the authentication information to the intermediary party, where the intermediary party may communicate the authentication information and stored credit card information to a processing server for validation of the information.

Applications for the systems and methods described herein are not limited to the aforementioned examples, but may be deployed in any number of contexts, as would be understood by one of ordinary skill in the art. Contents of the background are not to be considered as an admission of the contents as prior art.

In one aspect, the present disclosure describes a method including receiving, via a network, a request for registered payment options associated with a user computing device, where the request includes an identifier, where the identifier uniquely identifies one of the user computing device and the user. The method may include identifying, by a processor of a second computing device, one or more payment options associated with the device identifier, where each of the one or more payment options is associated with respective payment instrument information. The method may include providing, via the network, responsive to the request, one or more codes, where each code of the one or more codes identifies a respective payment option of the one or more payment options. The method may include receiving, via the network, responsive to providing the one or more codes, a first code of the one or more codes and transaction information, and accessing, by the processor, based upon the first code, payment instrument information associated with the payment option identified by the first code. The method may include causing, by the processor, the processing of the payment instrument information in relation to a transaction identified by the transaction data.

In some embodiments, causing the processing of the payment instrument information may include providing the payment instrument information to a credit card processing server. The method may include receiving, from the credit card processing server, a processing result associated with the payment instrument information.

In some embodiments, receiving the first code may include receiving an authentication value associated with the first code. The method may include authenticating, based in part upon the authentication value, use of the payment instrument information. The authentication value may include one of a CVV code and a zip code. Causing the processing of the payment instrument information may include causing the processing of the payment information and the authentication value to validate the authentication value in relation to the payment information. The method may further include receiving, responsive to causing the processing of the payment information, an indication of validation of the payment instrument information.

In some embodiments, the method includes, after receiving the first code and the transaction information, providing, to the user computing device, a temporary token associated with the payment instrument. The method may further include receiving, via the network, from an entity computing device, the temporary token, and providing, to the entity computing device, responsive to receiving the temporary token, a payment instrument token associated with the payment instrument information.

In some embodiments, the request for registered payment options is forwarded by an entity computing device from the user computing device. Providing the one or more codes may include providing the one or more codes to the entity computing device for provision to the user computing device. The request for registered payment options may originate from an entity application executing upon the user computing device, where the entity application includes a software library configured for communicating information with the second computing device.

In some embodiments, the request further includes a retail identifier identifying a retail entity. Identifying the one or more payment options may include identifying that none of the one or more payment options is associated with the retail entity identifier. The method may further include, prior to providing the one or more codes, requesting authorization to associate the one or more payment options with the retail entity identifier, and receiving authorization to associate the one or more payment options with the retail entity identifier.

In one aspect, the present disclosure describes a system including a processor and a memory, the memory storing instructions that, when executed by the processor, cause the processor to receive, via a network, from an entity computing device, a request for registered payment options associated with a user computing device, where the request includes an identifier, where the identifier uniquely identifies one of the user computing device and the user. The instructions may cause the processor to, responsive to the request, provide, via the network, to the entity computing device, an indication that no payment options are associated with the identifier. The instructions may cause the processor to, receive, via the network, payment instrument data associated with the user, and associate, with the identifier, the payment instrument data and a unique token for identifying the payment instrument data. The instructions may cause the processor to, provide, to the entity computing device, the unique token. The instructions may cause the processor to, cause the payment instrument data to be stored for future use.

In some embodiments, receiving the payment instrument data includes receiving the payment instrument data encrypted using an encryption technique capable of being decrypted by the system, where the entity computing device is disallowed unencrypted access to the payment instrument data.

In some embodiments, the instructions, when executed, further cause the processor to cause the processing of the payment instrument information. The payment instrument data may be processed by a third party payment instrument processing system to authenticate the payment instrument information. The instructions, when executed, may further cause the processor to receive, from the third party payment instrument processing system, a processing result. Receiving payment instrument data may further include receiving transaction data. The payment instrument data may be processed by a third party payment instrument processing system to conduct a transaction related to the transaction data.

In one aspect the present disclosure describes a non-transitory computer readable medium having instructions stored thereon, where the instructions, when executed by a processor, cause the processor to retrieve, from a designated storage area of a computing device, a device identifier. The instructions may cause the processor to provide, via a network to a third party computing system, the device identifier, and, responsive to providing the device identifier, receive, from the third party computing system, information regarding one or more payment options, where the one or more payment options are associated with the device identifier, and the one or more payment options consist of non-sensitive information. The instructions may cause the processor to prepare, for presentation to a user of the computing device within an entity application, a graphical user interface presenting the one or more payment options for selection. The instructions may cause the processor to, receive, responsive to presentation of the one or more payment options, an indication of selection of a first payment option of the one or more payment options. The instructions may cause the processor to provide, via the network, for processing payment with the third party computing system, the first payment option and transaction data associated with a transaction related to the first payment option, where the graphical user interface is presented within an application associated with an entity, where the entity is disallowed access to the device identifier.

In some embodiments, the instructions further cause the processor to prepare, for presentation to the user within the entity application, a second graphical user interface presenting a request for authentication information associated with the first payment option, where providing the first payment option and transaction data further includes providing an authentication value entered by the user via the second graphical user interface. The authentication value may include payment instrument information associated with the first payment option. The authentication value may include one of a CVV code and a zip code. The user device may include the computer readable medium. The device identifier may include a unique identifier generated by the third party computing system.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 3A through 3C illustrate a series of example user interfaces for conducting a transaction with a registered credit card;

FIGS. 4A through 4C illustrate a series of example user interfaces for registering a credit card for use in future transactions;

The features and advantages of the present invention will become more apparent from the detailed description set

DETAILED DESCRIPTION

Figure 1:
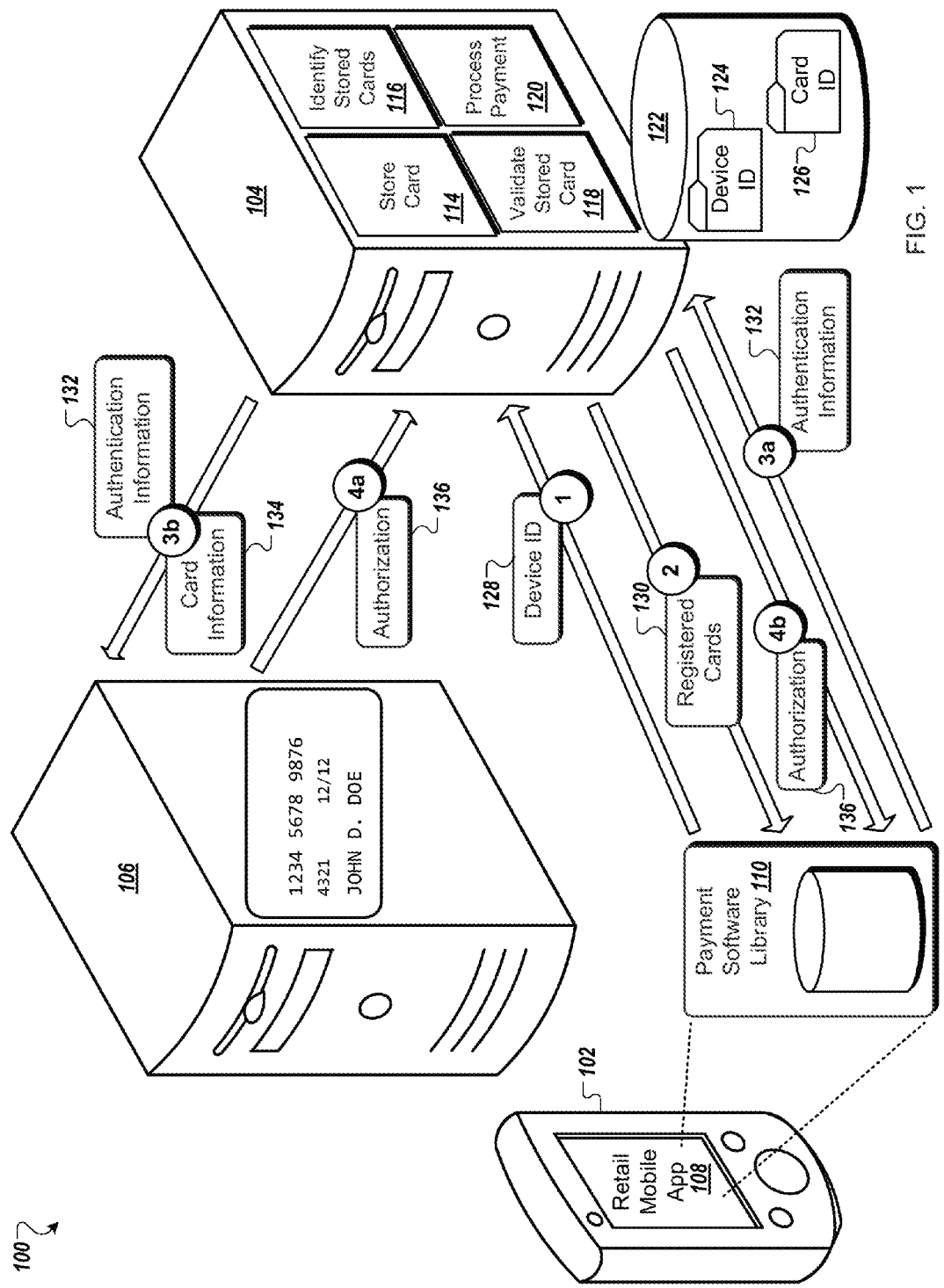
FIG. 1 is a block diagram of an example system for enabling electronic transactions via a mobile computing device.

FIG. 1 is a block diagram of an example system 100 for enabling electronic transactions on a mobile device 102. The mobile device 102, in some examples, may be a smart phone, personal digital assistant (PDA), tablet computer, or other personal electronic device capable of the installation and execution of a software application designed to enable a user to purchase goods and/or services from a retailer through electronic transactions. Rather than a mobile device, in some implementations, the device 102 may be a desktop computer, laptop computer, Smart TV, Internet appliance, or other computing device capable of the installation and execution of a software application designed to enable a user to purchase goods and/or services from a retailer through electronic transactions. While conducting an electronic transaction, the mobile device 102 relays transaction information, through a retail mobile application 108, to a payment gateway 104. The payment gateway 104 manages and validates stored payment instrument information on behalf of the retailer. During an electronic transaction conducted via the retail mobile application 108, the payment gateway 104 enables transaction processing through a payment instrument processing service 106.

The retail mobile application 108 installed upon the mobile device 102, in some implementations, is configured to communicate transaction information to the payment gateway 104 using a payment software library portion 110 of the retail mobile application 108. The payment software library portion 110 of the retail mobile application 108, in some implementations, is provided by the payment gateway 104 (e.g., a third party transaction processing solution provider) to the retailer for incorporation into the retail mobile application 108. The payments software library portion 110 executes function calls made by the retail mobile application 108 to communicate the transaction information to the payment gateway 104. The payment software library 110, for example, is provided to the retailer by the payment gateway 104 to incorporate into the retail mobile application 108 during development. The payment software library 110 includes function calls supporting the collection and repeated use of payment instrument information.

A user may install the retail mobile application 108 upon the mobile device 102 and initiate a transaction. The payment software library 110, in some implementations, provides a unique device identifier 128 to the payment gateway 104 to identify any payment instruments already registered to the payment gateway 104 by the mobile device 102. For example, the unique device identifier may include the telephone number of the mobile device 102, a unique device identifier configured by the manufacturer of the mobile device 102, or a unique identifier allocated by the retailer via the retail mobile application 108.

In other implementations, if a device identifier 128 has not yet been established, the payment software library 110 requests a unique identifier for the mobile device 102. For example, the payment gateway 104 may allocate a unique identifier (e.g., random number, string, etc.) for uniquely identifying the mobile device 102. The retail mobile application 108 may store the unique identifier in a memory location accessed by the payment software library 110 (e.g., a memory location available to any mobile application executing the functionality provided by the payment software library 110). The payment gateway 104, upon receipt of the device identifier 128, attempts to identify one or more stored (e.g., registered) cards using a card identification engine 116. For example, the card identification engine 116 may match the device identifier 128 to device identifiers 124 stored within a payment gateway database 122. Each device identifier 124 within the payment gateway database 122, for example, may be associated with one or more card identifiers 126. Although described in the following examples as operations performed in relation to a credit card, the card identifiers 126, in some examples, may include identifiers representing credit cards, debit cards, stored value cards, gift cards, and other electronic payment instruments.

If no cards are identified, a routine may be initiated by the retail mobile application 108 and a card storing engine 114 to collect and store information for a new payment instrument. The payment software library 110, in some implementations, includes one or more subprograms to encrypt and transmit payment instrument information to the payment gateway 104 for secure storage. The payment gateway 104, in some implementations, enables encryption of the information upon the mobile device 102 through an encryption key allocated to the retailer. The encryption mechanism, for example, may be described in U.S. patent application Ser. No. 13/633,106, entitled "Differential Client-Side Encryption of Information Originating from a Client", and filed Oct. 1, 2012, the contents of which are hereby incorporated by reference in its entirety.

If, instead, one or more cards were previously registered by the mobile device 102 (e.g., through the retail mobile application 108 or another application configured to use the payment software library 110 to communicate with the payment gateway 104), the card identification engine 116 may return registered cards 130 to the retail mobile application 108. The information provided by the payment gateway 104 regarding each of the registered cards 130, for example, may include a unique card identifier, a payment instrument type (e.g., American Express, Mastercard, Visa, etc.), the last four digits of the account number, and/or the expiration date of the card.

The retail mobile application 108 may present the registered cards 130 to the user for selection. The registered cards 130, for example, may each be identified to the user using a portion of the information (e.g., payment instrument type, last four digits of the account number, and/or the expiration date of the card).

Upon selection of one of the registered cards 130, in some implementations, the user is presented with a request for authentication information 132 to authenticate the user as the cardholder. The authentication information 132, in some implementations, includes a value that can be used by the payment instrument processing service 106 to validate card information. In some examples, the authentication information 132 may include a CVV code and/or a zip code of the card holder. In other implementations, payment processing proceeds without an authentication requirement. For example, based upon one or more of retailer preferences, user preferences, and type of mobile device 102 (e.g., personal device such as a smart phone vs. multi-user (e.g., family, etc.) device such as a tablet computer), the retail mobile application 102 may identify whether to proceed with payment or to first authenticate a selected payment instrument. In some implementations, the retail mobile application 108 is hardcoded to always authenticate.

Upon receipt of the authentication information 132, in some implementations, a card validation engine 118 of the payment gateway 104 provides the authentication information 132 to the payment instrument processing service 106 along with credit card information 134. The payment processing service 106 conducts a standard verification procedure (e.g., verifying matching information between the card information 134 and the authentication information 132) and provides an authorization result 136 to the payment gateway 104 in response. The card validation engine 118 then provides the authorization result 136 to the payment software library 110 of the retail mobile application 108.

In some implementations, a user password may be used in addition to or in lieu of the credit card-based authentication information 132. For example, for additional security, a user may password protect the retail mobile application 108 to avoid having purchases made without the consent of the cardholder. In another example, if the card holder has difficulty remembering the CVV number, the cardholder may instead password protect the card authorization process provided by the payment software library 110. The payment gateway 104, for example, may authenticate password information provided by the user.

Having authorized the credit card for use with the transaction, the retailer may rely upon the payment gateway 104, upon receipt of transaction data (e.g., amount, payee, etc.) to conduct the transaction, for example using a payment processing engine 120. Examples of the functionality of the processing of the transaction are described in further detail in U.S. patent application Ser. No. 13/633,106, entitled "Differential Client-Side Encryption of Information Originating from a Client", and filed Oct. 1, 2012.

Should the user install a second mobile application configured to conduct transactions via the payment gateway 104 (not illustrated), in some implementations, the second mobile application may use the payment software library 110 to display a list of the credit cards 130 that the user previously saved in response to the second mobile application providing the device identifier 128 to the payment gateway 104. In this manner, once a user has registered one or more payment instruments with the payment gateway 104 via the mobile device 102, all applications configured to conduct transactions via the payment gateway 104 (e.g., all applications performing functionality supported by the payment software library 110) may present that user the opportunity to use those payment instruments which were previously registered via other retailer mobile applications. Upon entering the credit card transaction form of the second retailer mobile application, for example, the user may be presented with the opportunity to authorize the second retailer mobile application to receive the payment instrument information (e.g., credit card number, expiration date, etc.) stored in relation to the retailer mobile application 108. For example, the user may complete authorization of payment instrument sharing between the retailer mobile application 108 and the second application by completing an authorization step presented by the payment software library 110. Authorization, for example, may include entering credit card authentication information (e.g., the CVV) for each saved payment instrument being authorized. This and other features are described in greater detail below.

Figure 2:
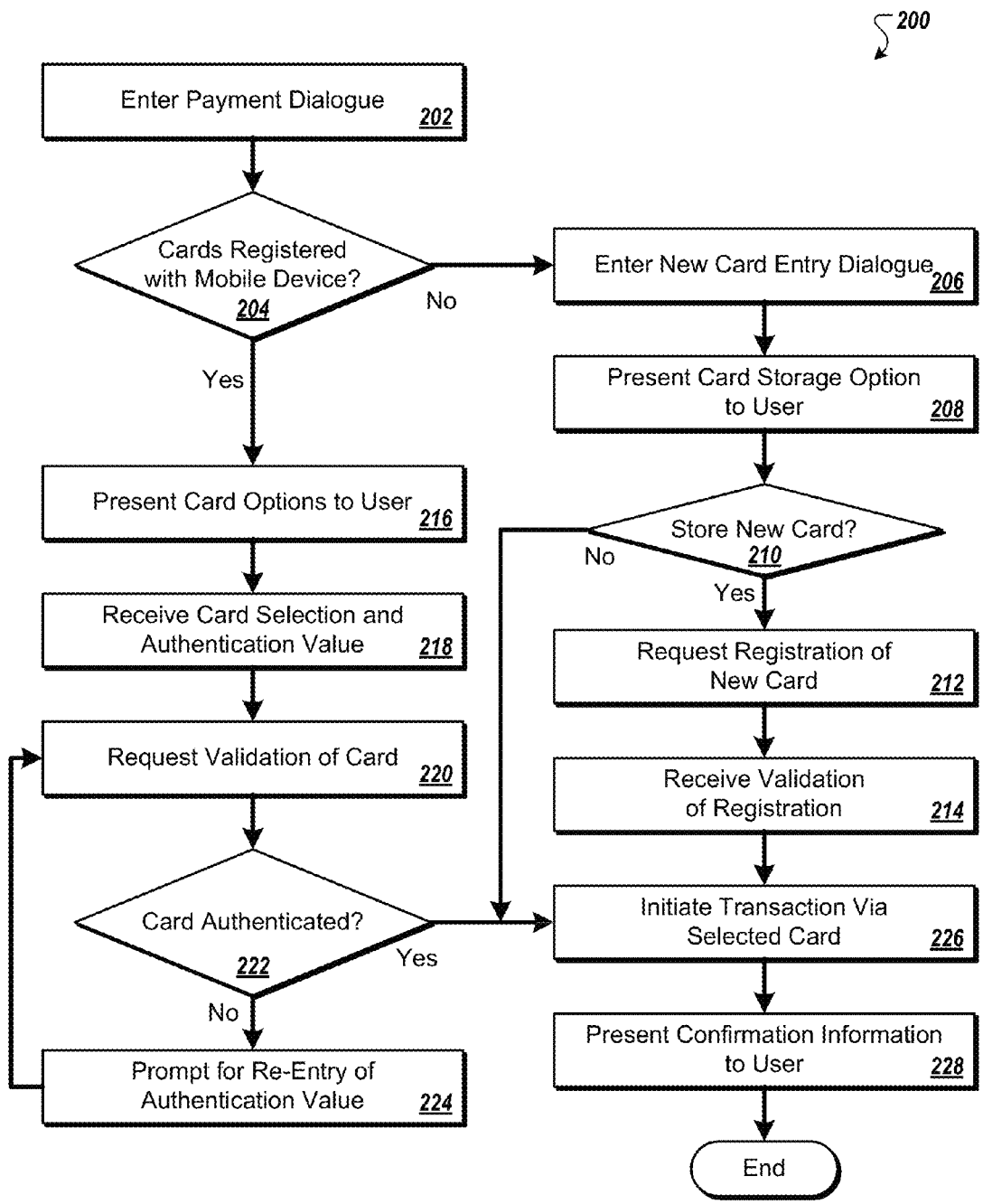
FIG. 2 is a flow chart of an example method for registering and using credit cards in electronic transactions.

FIG. 2 is a flow chart of an example method 200 for registering and using credit cards in electronic transactions. The method 200 may be performed, for example, by the retail mobile application 108 in cooperation with the software payment library 110 executing upon the mobile device 102.

In some implementations, the method 200 begins with entering a payment dialogue (202) of a retail mobile application configured to enable electronic transactions via a payment gateway. The payment dialogue, for example, may include purchase information (e.g., a list of items selected for purchase, a total funds owed, payment instrument information, etc.). The user may enter the payment dialogue, in some examples, from within a shopping cart review or upon selecting a control to make a purchase.

In some implementations, if no payment instruments have been registered with the mobile device (204), a new payment instrument entry dialogue may be entered (206). The new payment instrument entry dialogue includes a request for payment instrument information. For example, one or more input fields may be presented to the user for entering payment instrument information.

If the new payment instrument is to be stored for future use (210), in some implementations, registration of the new payment instrument is requested (212). In some implementations, upon entry, by the user, of payment instrument information the user is presented with the option to store the new payment instrument information with a third party entity, such as the payment gateway 104 described in relation to FIG. 1. The option may be presented by a routine provided by the payment software library 110. In other implementations, the payment instrument information may be automatically stored (e.g., by default, based upon previously configured user preferences, etc.). In some implementations, the payment instrument information may include authentication information, such as, in some examples, a CVV code, expiration date, or user password, authenticating the payment instrument and/or the user supplying the payment instrument information. The request, for example, may be relayed to the payment gateway 104.

In some implementations, validation of the registration of the new payment instrument is received (214). For example, the payment gateway 104 may provide the software payment library 110 of the retail mobile application 108 with a validation of the registration of the new payment instrument.

If, rather than entering new payment instrument information, one or more payment instruments were found to be previously registered with the mobile device (204), in some implementations, the one or more registered payment instruments are presented as payment options to the user (216). For example, the routine provided by the software payment library 110 of the retail mobile application 108 may present each registered payment instrument through partial card identification (e.g., credit card type, payment instrument name, expiration date, last four digits of the account number, etc.). A selectable control may be included in the presentation of each payment instrument configured, upon selection, to initiate payment processing using the associated payment instrument.

In some implementations, a payment instrument selection and corresponding authentication value is received (218). In some implementations, the authentication value relates to the payment instrument. For example, the payment instrument may be a credit card, and the authentication value may include the CVV code and/or user zip code for authentication with a credit card processing system, such as the payment instrument processing service 106 described in relation to FIG. 1. In some implementations, the authentication value relates to a general authentication. For example, the user may password protect the retailer mobile application from unauthorized credit card use. In another example, the user may biometrically protect (e.g., fingerprint scan, voice scan, etc.) the retailer mobile application from unauthorized credit card use. In other implementations, no authentication value is required. For example, if the method 200 is being performed on a single user device, the user may not be required to authenticate the selection of the payment instrument. Authentication, in some implementations, may be optional based on one or more of retailer preference settings and user preference settings.

In some implementations, validation of the payment instrument is requested (220). If the authentication value relates to the payment instrument, in some implementations, the payment gateway may forward the authentication information and credit card information (e.g., as stored with the payment gateway) to the payment instrument processing service 106 (as described in relation to FIG. 1) for validation. If, instead, the authentication value relates to personal authentication (e.g., password, biometric detail, etc.), in some implementations, the personal authentication value is provided to the payment gateway 104 for authentication. In other implementations, rather than requesting validation, validation may be performed within the mobile device. For example, the retail mobile application may validate the biometric information using functionality available within the mobile device 102.

If authentication of the payment instrument has failed (222), in some implementations, the user may be prompted for re-entry of the authentication value (224) and validation of the authentication information may be requested again (220). In some implementations, the user may be provided with a certain number of attempts (e.g., 3, 5, etc.) to present valid authentication information prior to being denied access to the payment instrument for completing the transaction.

If, instead, the payment instrument is authenticated (222), in some implementations, the transaction is initiated via the selected payment instrument (226). For example, the transaction may be initiated via the payment gateway 104. Processing of the transaction, in some implementations, may be conducted external to the viewpoint of the user interface of the retail mobile application 108. For example, the user may be redirected to continue interacting with the retail mobile application 108 while the transaction is processed in the background.

In some implementations, confirmation information is presented to the user (228). The confirmation information, in some implementations, relates to success in initiating transaction processing via the payment gateway 104. For example, the actual transaction may be pending processing via the payment instrument processing service 106. In other implementations, the confirmation information relates to successful completion of payment of the transaction. The confirmation information, in some implementations, is presented to the user outside the retailer mobile application 102. For example, a retailer server may email the user regarding the details of the completed transaction.

While described in a particular series of steps, in some implementations, one or more steps of the method 200 may be conducted in a different order or in parallel with each other. For example, transaction may be initiated using the new payment instrument (226) prior to storing the new payment instrument (210). In some implementations, one or more steps may be combined or split into two or more steps. For example, rather than receiving selection of the payment instrument and an authentication value (218), in some implementations, an authentication value (e.g., password, biometric identifier, etc.) may be obtained prior to presenting the payment instrument options to the user (216). In some implementations, one or more steps may be added or adjusted within the method 200. For example, in some implementations, rather than requesting a new payment instrument (206), the method 200 may present one or more stored payment instruments affiliated with the retailer. In one example, the retailer may store payment instrument data on a retailer server. Further to this example, the retailer, upon authorization from the user, may forward payment instrument data to the payment gateway for entry as a new payment option. In another example, the retailer may use a third party service for storage of payment instrument data, such as the payment gateway 104 described in relation to FIG. 1. If the payment gateway 104 has stored retailer-specific payment instruments related to the user in the past, for example, the user may be prompted to migrate the previously stored payment instrument for usage as a payment instrument registered to the particular device (e.g., a payment instrument available for use to any application executing upon that mobile device that is configured to use the payment instrument gateway). Other modifications of the method 200 are possible without exceeding the scope and purpose of the method 200.

Figure 3B:
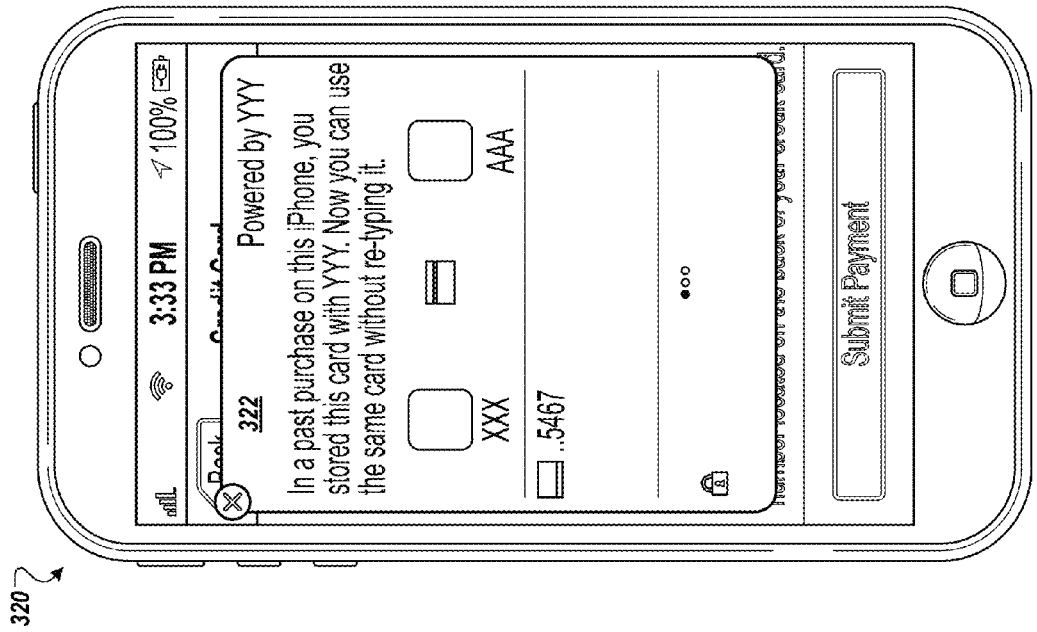
Figure 3A:
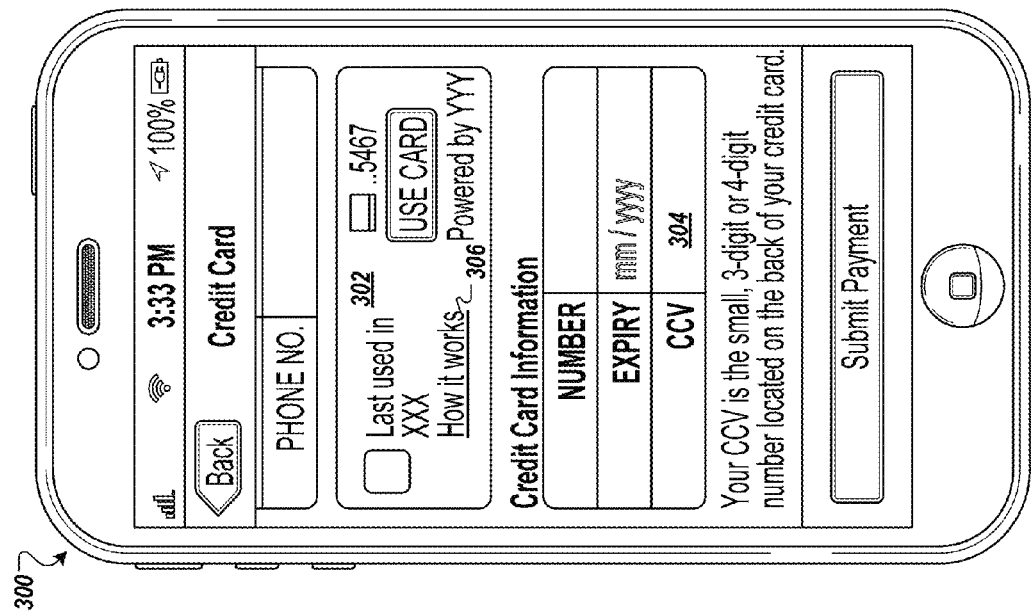

FIGS. 3A through 3C illustrate a series of example user interfaces for conducting a transaction with a registered credit card. The user interfaces, for example, may be presented within the retailer mobile application 108 by the payment software library 110, as described in relation to FIG. 1.

As illustrated in FIG. 3A, an example payment dialogue screen 300 includes a stored payment instrument option 302. A user may select the stored payment instrument option 302 and select a submit payment control 304 to initiate processing of a transaction payment using a payment instrument registered with a payment gateway, such as the payment gateway 104 described in relation to FIG. 1.

As illustrated in FIG. 3B, an example information dialogue screen 320 is presented to the user, for example upon selection of a "how it works" control 306 with the stored payment instrument option 302. Within the information dialogue screen 320, an information box 322 is presented to the user, explaining the stored payment instrument option 302.

As illustrated in FIG. 3C, an example payment instrument validation dialogue screen 340 is presented to the user, for example upon selection of the stored payment instrument option 302. Within the payment instrument validation dialogue screen 340, a text entry control 342 provides the user with the opportunity to present payment instrument authentication information (e.g., the credit card CVV). Upon completion of entering the authentication information into the text entry control 342, the user, in some implementations, selects a submit control 344 to submit the authentication information for validation.

Figure 4C:
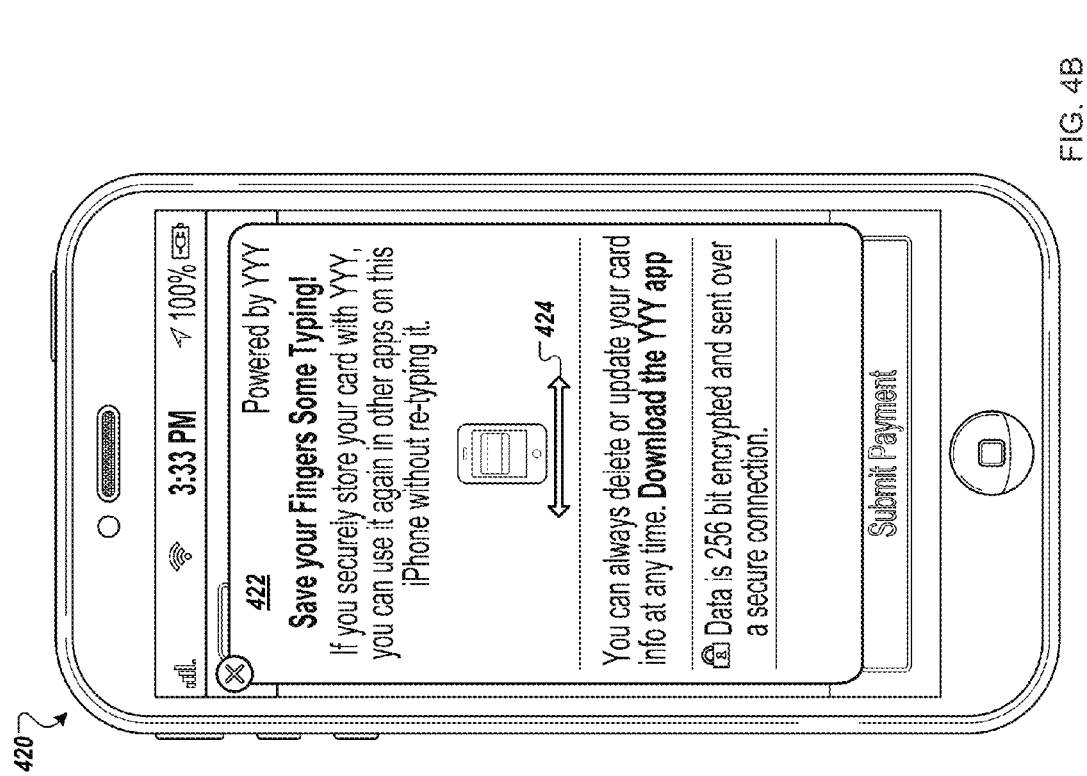
Figure 4B:
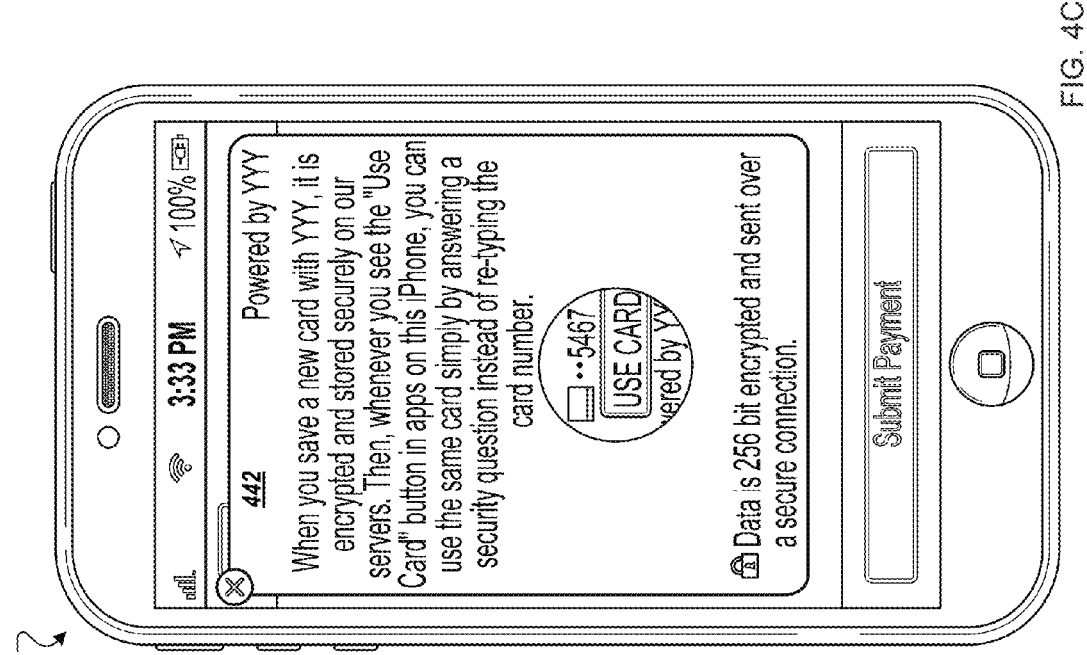

FIGS. 4A through 4C illustrate a series of example user interfaces for registering a credit card for use in future transactions. The user interfaces, for example, may be presented within the retailer mobile application 108 by the payment software library 110, as described in relation to FIG. 1.

As illustrated in FIG. 4A, an example payment dialogue screen 400 presents the user with a series of information entry controls 402 to enter payment instrument information (e.g., credit card information, personal information, etc.). A user may complete the requested information in the information entry controls 402 and select a submit payment control 404 to initiate processing of a transaction payment using the entered payment instrument information. In some implementations, the user may select a save option 404 to save the new payment instrument with a payment gateway, such as the payment gateway 104 described in relation to FIG. 1. Upon entering the payment instrument information and, optionally, selecting the save option 404, the user may select a submit payment control 406 to initiate processing of a transaction payment using the entered payment instrument.

In some implementations, upon selection of a how it works control 408, the user is presented with an information dialogue 422, as illustrated in relation to a screen shot 420 of FIG. 4B. Turning to FIG. 4B, the information dialogue 422 explains the storage of the payment instrument information with the payment gateway.

Further details regarding the functionality of storing the payment instrument with the payment gateway, in some implementations, are presented to the user upon selection of a more control 424. For example, turning to FIG. 4C, a screen shot 440 illustrates an information dialogue 442 discussing the functionality of storing the payment instrument with the payment gateway.

Figure 5A:
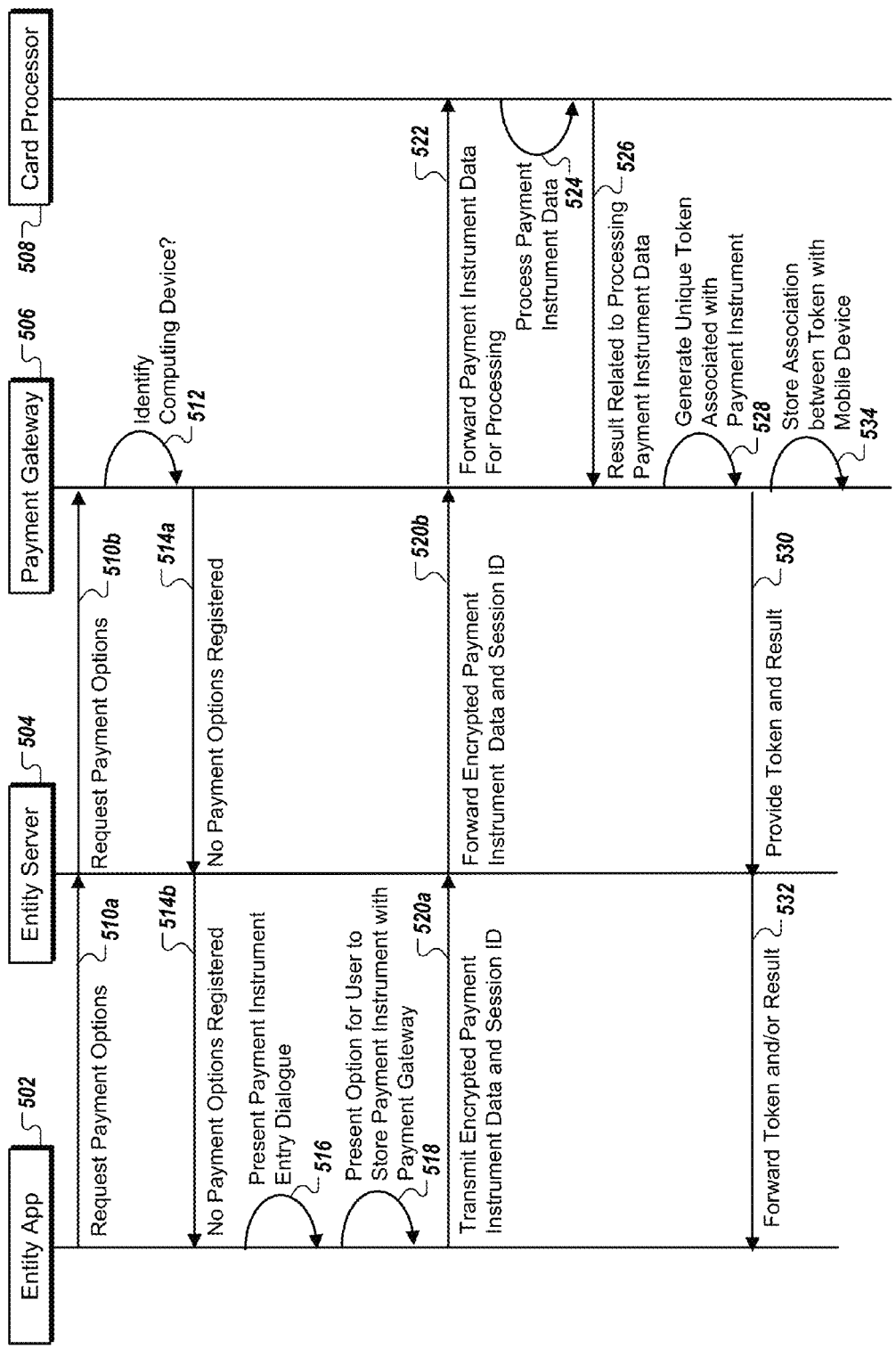
FIG. 5A is a swim lane diagram of an example method for registering a credit card for use in future transactions.
Figure 5B:
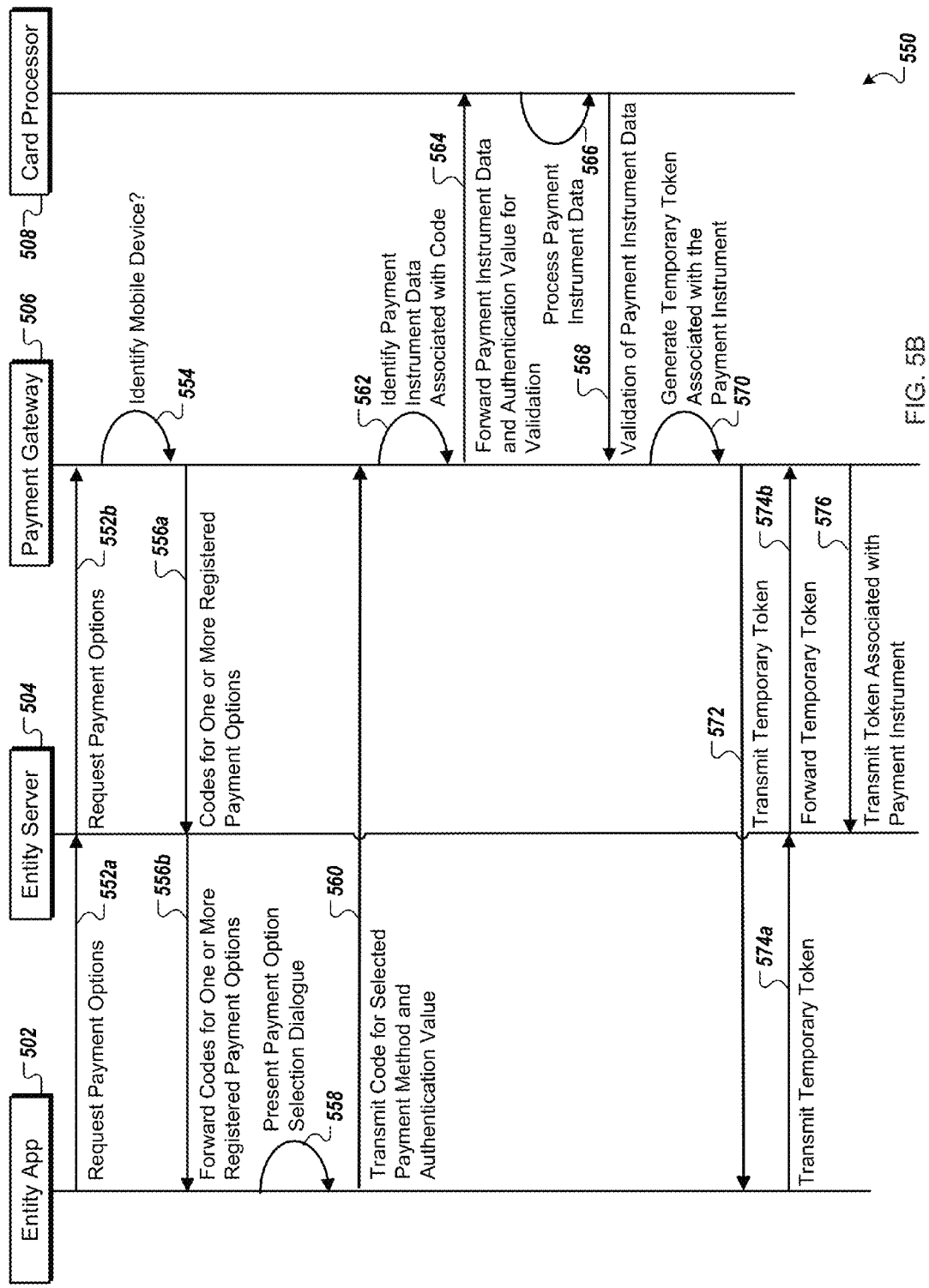
FIG. 5B is a swim lane diagram of an example method for conducting a transaction with a registered credit card.

FIGS. 5A and 5B illustrate swim lane diagrams of example methods for registering, accessing, and using payment instrument information stored with a third party entity (e.g., payment processing gateway) for conducting electronic transactions with another entity (e.g., retailer). The methods involve an entity application 502 executing upon a computing device (e.g., personal electronics device, home computer, mobile device, etc.). The entity application 502, for example, may be the retail mobile application 108 executing upon the mobile device 102, as described in relation to FIG. 1. The entity, for example, may include a retailer or other organization providing goods and/or services for purchase via the entity application 502. The entity application includes third party software algorithms, for example in the form of the software payment library 110 as described in relation to FIG. 1, to enable the processing of transactions. In some implementations, the third party software algorithms provided within the entity application allow payment instrument information and transaction processing to proceed without exposing sensitive information (e.g., credit card number, etc.) to the entity. The third party software algorithms of the entity application 502 communicate information to a payment gateway 506. In some implementations, the third party software algorithms of the entity application 502 relays information to the payment gateway 506 (e.g., the payment gateway 104 as described in relation to FIG. 1) via an entity server 504. For example, non-sensitive information may be exposed to the entity server 504 such that the entity may track transaction processing events without exposure to the sensitive information. In other implementations, the third party software algorithms of the entity application 502 issues separate messages to the entity server 504 (e.g., lacking sensitive information and other payment gateway specific information) and the payment gateway 506. The payment gateway 506, in turn, presents information to a payment instrument processing server 508 (e.g., the payment instrument processing service 106 as described in relation to FIG. 1) for processing of a payment instrument involved in a transaction. In this manner, the payment gateway 506 shields the entity server 504 from direct handling of sensitive (e.g., payment instrument-related) information by handling the transaction communications on behalf of the entity. Additionally, the payment gateway 506 manages payment instrument options for the computing device executing the entity application 502, such that other applications executing upon the computing device may take advantage of payment instruments previously registered via the payment gateway 506. For example, other applications containing the third party software algorithms may share in information previously stored with the payment gateway 506 via the entity application 502.

Turning to FIG. 5A, an example method 500 for registering a credit card with a third party entity, via an application provided by another entity, for use in future transactions is presented. The method 500, in some implementations, begins with an entity application 502 requesting payment options (510a) from the entity server 504. In some implementations, the payment software library of the entity application 502 issues the request 510a. The request, for example, may include information identifying the computing device executing the entity application 502. In some implementations, the entity server 504 forwards the request for payment options (510b) to the payment gateway 506. In other implementations, the payment software library of the entity application 502 requests payment options directly from the payment gateway 506.

In some implementations, the payment gateway 506 attempts to identify the computing device (512). If the computing device is not identified, or if there are no active (e.g., not expired) payment instruments registered in relation to the computing device, the payment gateway 506 responds (514a) to the entity server 504 informing the entity server 504 that no payment options are registered. The entity server 504, in turn, informs the entity application 502 that no payment options are registered (514b). In other implementations, the payment gateway 506 responds directly to the payment software library portion of the entity application 502. In some implementations, along with being informed of the lack of registered payment options, the entity application 502 is provided a session identifier for a transaction session established with the payment gateway 506.

In some implementations, the entity application 502 presents a payment instrument entry dialogue (516) to the user of the computing device, such as the screen shot 400 illustrated in FIG. 4A. For example, the entity application 502 may present a credit card form for entering credit card information. In some implementations, the payment instrument entry dialogue is presented by the payment software library portion of the entity application 502.

In some implementations, the entity application 502 presents an option (518) for the user to store a new payment instrument with the payment gateway 506. For example, the payment software library portion of the entity application may present an offer to store payment instrument information with the payment gateway 506. In some implementations, the option may be presented in the same user interface as the payment instrument entry dialogue, for example as illustrated in FIG. 4A. In other implementations, the option may be presented as a follow-on query, for example upon input, by the user, of new payment instrument information.

In some implementations, encrypted payment instrument data and a session identifier are transmitted (520a) from the entity application 502 to the entity server 504. The payment software library portion of the entity application 502, for example, may provide the encrypted payment instrument data. The entity server 504, in turn, forwards the encrypted payment instrument data and session identifier (520b) to the payment gateway 506. The entity server 504, in some implementations, logs information related to the payment instrument data, such as non-encrypted (e.g., public) information. In other implementations, the entity application 502 transmits the encrypted payment instrument information and the session identifier directly to the payment gateway 506.

The payment gateway 506, in some implementations, forwards payment instrument data for processing (522) with the payment instrument processing server 508. For example, the payment gateway 506 may decrypt the payment instrument data previously encrypted by the payment software library portion of the entity application 502. The payment software library portion of the entity application 502, for example, may encrypt the payment instrument data using an encryption algorithm provided by the payment gateway 506.

In some implementations, the payment instrument processing server 508 processes the payment instrument data (524). The payment instrument processing server 508 then provides a result related to the processing of the payment instrument data (526) to the payment gateway 506. The result, for example, may include verification of the user's authorization to use the payment instrument for the transaction. In another example, the result may include verification of success of payment using the payment instrument.

The payment gateway 506, in some implementations, generates a unique token associated with the payment instrument (528). The unique token, for example, may be used by the entity application 502 to identify the payment instrument when conducting a transaction at a later time. The entity server 504, for example, may recognize the unique token and associate a transaction with a particular payment instrument without directly having access to the payment instrument information. In some implementations, the unique token is generated prior to completion of processing of the payment instrument data. For example, upon validation of credit card information but prior to completion of a payment using the credit card, the payment gateway 506 may generate a unique token associated with the credit card.

In some implementations, the payment gateway 506 provides the unique token and the processing result (530) to the entity server 504. The entity server 504, in some implementations, forwards at least one of the processing result and the unique token (532) to the entity application 502. If the result relates to the processing of a payment, the processing may occur at some time after the submission of payment information by the user. In this circumstance, the result may be presented to the user via a different communication method, such as an email alert. In some implementations, the token may be reserved by the entity server 504 and withheld from the entity application 502, for example for security purposes.

Turning to FIG. 5B, an example method 550 for conducting a transaction with a registered credit card, in some implementations, begins with the entity application 502 requesting payment options (552*a*) from the entity server 504. The request may be provided by a payment software library portion of the entity application 502. The request, for example, may include information identifying the computing device executing the entity application 502. In some implementations, the entity server 504 forwards the request for payment options (552*b*) to the payment gateway 506. In other implementations, the entity application 502 communicates directly with the payment gateway 506.

In some implementations, the payment gateway 506 attempts to identify payment instruments registered with the computing device (554). The payment gateway, in some implementations, provides codes associated with one or more registered payment options (556*a*) to the entity server 504. In some implementations, the codes are each unique tokens previously generated by the payment gateway 506 to identify the registered payment options. In some implementations, the codes include information used to uniquely identify information (e.g., stored tokens, stored public information) related to the payment options. The unique identification information, for example, may be t stored by the entity server 504 or by the computing device executing the entity application 502.

In some implementations, the entity server 504 forwards the codes for the one or more registered payment options (556*b*) to the entity application 502. For example, the entity server 504 may supply the codes for the one or more registered payment options to a payment software library portion of the entity application 502. Additionally or alternatively, the entity server 504 may supply payment instrument-related information identified as being associated with the codes. In other implementations, the payment gateway 506 may supply codes directly to the payment software library portion of the entity application 502, and the payment software library portion of the entity application 502 may correlate the codes with stored public information related to each payment instrument (e.g., as stored on the mobile device executing the entity application 502).

In some implementations, the payment software library portion of the entity application 502 presents a payment option selection dialogue (558). The payment option selection dialogue, for example, may include controls associated with each of the payment options identified by the payment gateway 506, such as the control illustrated in relation to FIG. 3A.

In some implementations, the entity application 502 transmits (560) the code associated with the selected payment method and an authentication value to the payment gateway 506. The payment software library portion of the entity application 502, for example, may transmit the information to the payment gateway 506. The authentication value, for example, may include a CVV code, user zip code, or other information useful to the payment instrument processing server 508 in validating the user access to the payment instrument.

In some implementations, the payment gateway 506 identifies payment instrument data associated with the code (562). For example, sensitive information, such as a credit card number, stored by the payment gateway 506 may be retrieve in response to receipt of the code provided by the payment software library portion of the entity application 502.

In some implementations, the payment gateway 506 forwards payment instrument data and the authentication value for validation (564) with the payment instrument processing server 508. In some implementations, the payment instrument processing server 508 processes the payment instrument data (566). In some implementations, the payment processing server 508 provides validation of the payment instrument data (568) to the payment gateway 506.

In some implementations, the payment gateway 506 generates a temporary token associated with the payment instrument (570). Rather than providing the actual unique token (e.g., generated in step 528 of method 500), for example, the payment gateway 506 may secure the payment instrument information by transmitting a temporary token to the entity application 502. In some implementations, the payment gateway 506 transmits the temporary token (572) to the entity application 502. For example, the temporary token may be provided to the payment software library portion of the entity application 502.

In some implementations, the entity application 502 transmits the temporary token (574*a*) to the entity server 504. For example, the software library portion of the entity application 502 may provide the temporary token to the entity server 504. The entity server 504, in some implementations, forwards the temporary token (574*b*) to the payment gateway 506. Responsive to receipt of the temporary token, in some implementations, the payment gateway 506 transmits the unique token associated with the payment instrument (576) to the entity server 504. In this manner, for example, the entity server 504 may correlate transaction information to a uniquely identified payment instrument.

Figure 6:
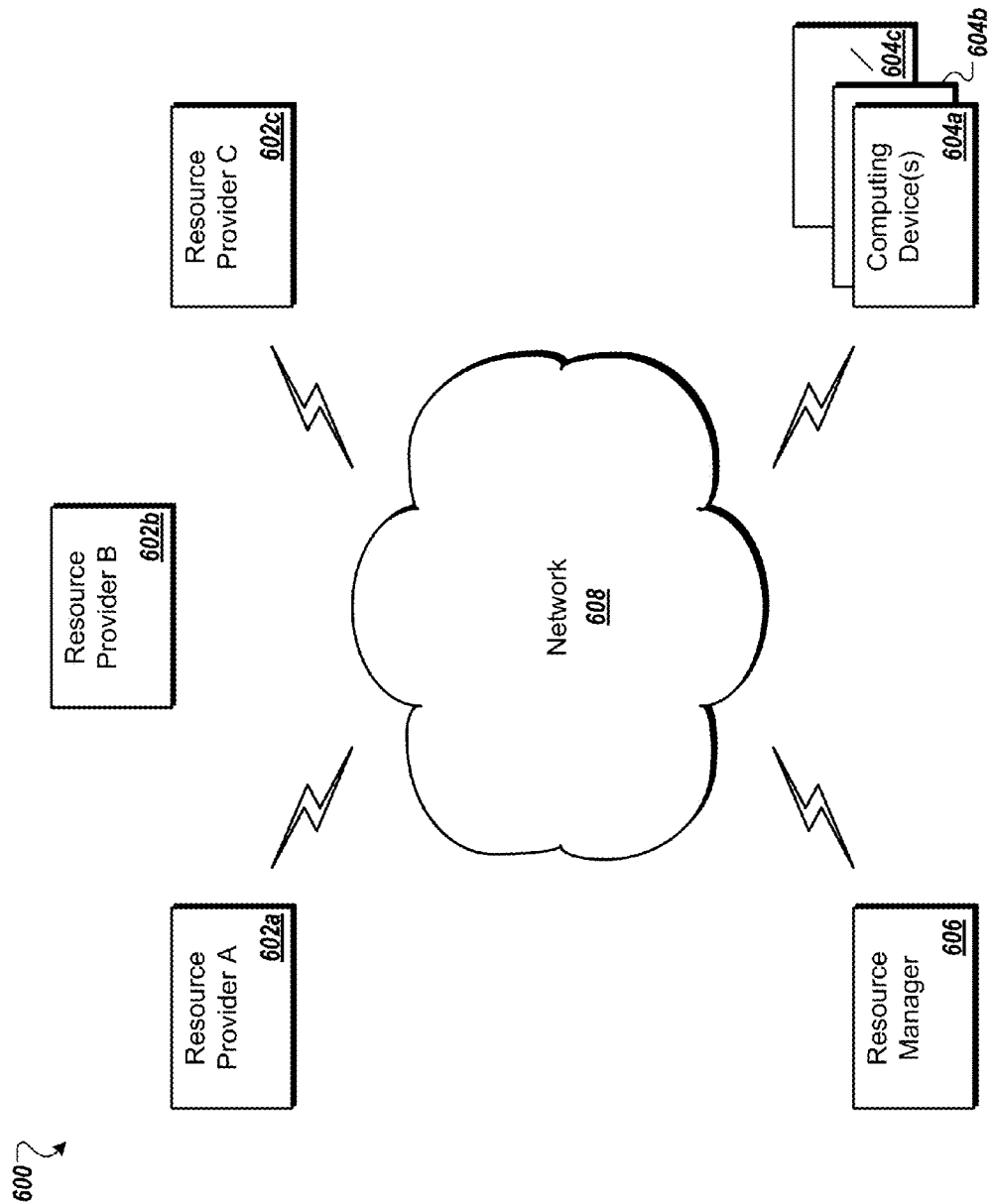
FIG. 6 is a block diagram of a network environment for enabling electronic transactions on a mobile device.

As shown in FIG. 6, an implementation of an exemplary cloud computing environment 600 for enabling electronic transactions via a mobile device is shown and described. The cloud computing environment 600 may include one or more resource providers 602a, 602b, 602c (collectively, 602). Each resource provider 602 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 602 may be connected to any other resource provider 602 in the cloud computing environment 600. In some implementations, the resource providers 602 may be connected over a computer network 608. Each resource provider 602 may be connected to one or more computing device 604a, 604b, 604c (collectively, 604), over the computer network 608.

The cloud computing environment 600 may include a resource manager 606. The resource manager 606 may be connected to the resource providers 602 and the computing devices 604 over the computer network 608. In some implementations, the resource manager 606 may facilitate the provision of computing resources by one or more resource providers 602 to one or more computing devices 604. The resource manager 606 may receive a request for a computing resource from a particular computing device 604. The resource manager 606 may identify one or more resource providers 602 capable of providing the computing resource requested by the computing device 604. The resource manager 606 may select a resource provider 602 to provide the computing resource. The resource manager 606 may facilitate a connection between the resource provider 602 and a particular computing device 604. In some implementations, the resource manager 606 may establish a connection between a particular resource provider 602 and a particular computing device 604. In some implementations, the resource manager 606 may redirect a particular computing device 604 to a particular resource provider 602 with the requested computing resource.

Figure 7:
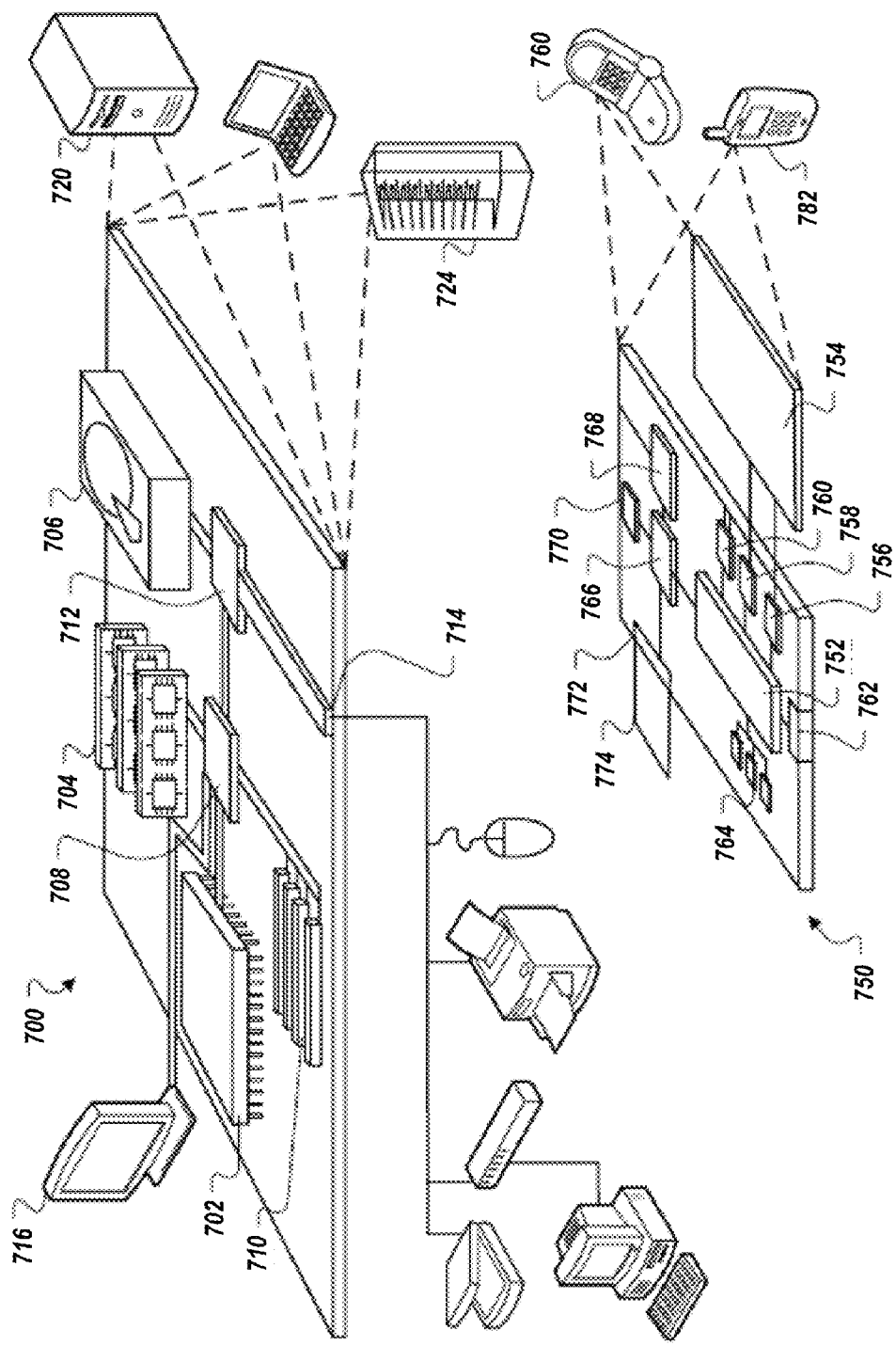
FIG. 7 is a block diagram of a computing device and a mobile computing device.

FIG. 7 shows an example of a computing device 700 and a mobile computing device 750 that can be used to implement the techniques described in this disclosure. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth®, Wi-Fi™, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, an environment, systems and methods for enabling electronic transactions are provided. Having described certain implementations of methods and apparatus for supporting electronic transactions via a mobile device, it will now become apparent to one of skill in the art that other implementations incorporating the concepts of the disclosure may be used. Therefore, the disclosure should not be limited to certain implementations, but rather should be limited only by the spirit and scope of the following claims.

What is claimed:

1. A method comprising:
   providing, by a payment gateway to a retailer, a software library comprising function calls for a mobile application executing an encryption process of the payment gateway on transaction information communicated by the mobile application;
   receiving, through a communications interface of the payment gateway via a network, a request for registered payment options associated with a user computing device from the mobile application;
   generating a plurality of codes, each code comprising a token representing a respective payment option of the registered payment options, the token uniquely identifying the respective payment option to an entity computing device of the retailer without providing payment information for the respective payment option to the entity computing device;
   providing, by the communications interface of the payment gateway via the network, responsive to the request, the plurality of codes output through a graphical user interface of the user computing device;
   in response to receiving, by the communications interface of the payment gateway via the network, a communication from the mobile application that is responsive to the plurality of codes displayed on the graphical user interface, determining a first code and transaction information from the communication, wherein the first code identifies a payment option associated with a payment instrument;
   accessing, by a processor of the payment gateway, based upon the first code, payment instrument information associated with the payment option;
   causing, by the processor of the payment gateway, the processing of the payment instrument information in relation to a transaction identified by the transaction information and receiving an indication of validation of the payment instrument;
   in response to receiving the indication of the validation of the payment instrument information, generating a temporary token associated with the payment option, wherein the temporary token comprises a unique identifier for the payment instrument information that secures the payment instrument information from the entity computing device;
   transmitting, through the communications interface of the payment gateway via the network, the temporary token to the user computing device; and
   receiving the temporary token from the retailer without providing the payment instrument information to the entity computing device.

2. The method of claim 1, wherein causing the processing of the payment instrument information comprises providing the payment instrument information to a credit card processing server, and wherein the method further comprises:
   receiving, from the credit card processing server, a processing result associated with the payment instrument information.

3. The method of claim 1, wherein receiving the first code further comprises receiving an authentication value associated with the first code, and wherein the method further comprises:
   authenticating, based in part upon the authentication value, use of the payment instrument information.

4. The method of claim 3, wherein:
   the authentication value comprises one of a CVV code or a zip code; and
   causing the processing of the payment instrument information comprises causing the processing of the payment information and the authentication value to validate the authentication value in relation to the payment information.

5. The method of claim 1, further comprising:
   receiving, through the communications interface of the payment gateway via the network, encrypted payment instrument information encrypted by the mobile application using the encryption process;
   causing the encrypted payment instrument information to be processed;
   receiving a result associated with the processing of the encrypted payment instrument information; and
   generating the temporary token associated with the payment instrument information.

6. The method of claim 1, further comprising:
providing, to the entity computing device, responsive to receiving the temporary token, a payment instrument token associated with the payment instrument information.

7. The method of claim 1, wherein the request for registered payment options is forwarded by the entity computing device from the user computing device, and wherein the providing the plurality of codes comprises providing the plurality of codes to the entity computing device for provision to the user computing device.

8. The method of claim 1, wherein the request further comprises a retail identifier identifying the retailer, and wherein, prior to providing the plurality of codes, the method further comprises:
requesting authorization to associate one or more payment options with the retail identifier;
receiving authorization to associate the one or more payment options with the retail identifier using the encryption process; and
registering the one or more payment options as the registered payment options based on the authorization.

9. The method of claim 1, further comprising:
storing, by the payment gateway, the payment instrument information for future use.

10. The method of claim 1, wherein the mobile application determines a unique identifier for the user computing device that identifies the registered payment options, wherein the request comprises the unique identifier, and wherein the method further comprises:
identifying, by the payment gateway, the registered payment options associated with the unique identifier, wherein each of the registered payment options is associated with respective payment instrument information.

11. The method of claim 10, wherein the unique identifier is determined using one of a unique device identifier, a telephone number, an software library unique identifier associated with the software library installed on the user computing device, or a random string generated by the software library.

12. A payment gateway system for processing payment through registered payment options comprising:
a communications interface;
a non-transitory memory; and
one or more hardware processors coupled to the non-transitory memory and configured to read instructions from the non-transitory memory to cause the system to perform operations comprising:
providing, to a retailer through the communications interface via a network, a software library comprising function calls for a mobile application executing an encryption process of the payment gateway system on transaction information communicated by the mobile application;
receiving, through the communications interface via the network, a request for registered payment options associated with a user computing device from the mobile application;
generating a plurality of codes, each code comprising a token representing a respective payment option of the registered payment options, the token uniquely identifying the respective payment option to an entity computing device of the retailer without providing payment information for the respective payment option to the entity computing device;
providing, by the communications interface via the network, responsive to the request, the plurality of codes output through a graphical user interface of the user computing device;
in response to receiving, by the communications interface via the network, a communication from the mobile application that is responsive to the plurality of codes displayed on the graphical user interface, determining a first code and transaction information from the communication, wherein the first code identifies a payment option associated with a payment instrument;
accessing, based upon the first code, payment instrument information associated with the payment option;
processing the payment instrument information in relation to a transaction identified by the transaction information and receiving an indication of validation of the payment instrument;
in response to receiving the indication of the validation of the payment instrument information, generating a temporary token associated with the payment option, wherein the temporary token comprises a unique identifier for the payment instrument information that secures the payment instrument information from the entity computing device;
transmitting, through the communications interface via the network, the temporary token to the user computing device; and
receiving the temporary token from the retailer without providing the payment instrument information to the entity computing device.

13. The payment gateway system of claim 12, wherein processing the payment instrument information comprises providing the payment instrument information to a credit card processing server, and wherein the operations further comprise:
receiving, from the credit card processing server, a processing result associated with the payment instrument information.

14. The payment gateway system of claim 12, wherein the operations further comprise:
receiving, through the communications interface of the payment gateway system via the network, encrypted payment instrument information encrypted by the mobile application using the encryption process;
causing the encrypted payment instrument information to be processed;
receiving a result associated with the processing of the encrypted payment instrument information; and
generating the temporary token associated with the payment instrument information.

15. The payment gateway system of claim 14, wherein the operations further comprise:
providing, through the communications interface to the entity computing device, responsive to receiving the temporary token, a payment instrument token associated with the payment instrument information.

16. The payment gateway system of claim 12, wherein the request for registered payment options is forwarded by the entity computing device from the user computing device, and wherein the operations further comprise:
providing the codes to the entity computing device for provision to the user computing device.

17. The payment gateway system of claim 12, wherein the request further comprises a retail identifier identifying the retailer, and wherein, the operations further comprise:

requesting authorization to associate one or more payment options with the retail identifier prior to providing the codes; and receiving authorization to associate the one or more payment options with the retail identifier.

18. The payment gateway system of claim 12, wherein the operations further comprise:

presenting a request for authentication information associated with the payment option identified by the first code; and receiving authentication value entered by the user computing device.

19. The payment gateway system of claim 18, wherein the authentication value comprises the payment instrument information associated with the payment option identified by the first code.

20. The payment gateway system of claim 18, wherein the authentication value comprises one of a CVV code or a zip code.

21. The payment gateway system of claim 12, wherein the mobile application determines a unique identifier for the user computing device that identifies the registered payment options, wherein the request comprises the unique identifier, and wherein the operations further comprise:

identifying, by the payment gateway system, the registered payment options associated with the unique identifier, wherein each of the registered payment options is associated with respective payment instrument information.

22. The payment gateway system of claim 21, wherein the unique identifier is determined using one of a unique device identifier, a telephone number, an software library unique identifier associated with the software library installed on the user computing device, or a random string generated by the software library.

* * * * *

UNITED STATES PATENT AND TRADEMARK OFFICE
CERTIFICATE OF CORRECTION

PATENT NO. : 9,947,011 B2
APPLICATION NO. : 13/755262
DATED : April 17, 2018
INVENTOR(S) : Andrew Kortina et al.

It is certified that error appears in the above-identified patent and that said Letters Patent is hereby corrected as shown below:

In the Claims

In Claim 18, Column 25, Line 11, change "receiving authentication" to --receiving an authentication--.

Signed and Sealed this
Nineteenth Day of June, 2018

Andrei Iancu
*Director of the United States Patent and Trademark Office*